Aug. 30, 1932.  R. L. SKINNER  1,874,129
BRAKE
Filed Jan. 23, 1930   2 Sheets-Sheet 1

Reuben L. Skinner
Inventor
By C. A. Snow & Co.
Attorneys.

Aug. 30, 1932.  R. L. SKINNER  1,874,129
BRAKE
Filed Jan. 23, 1930  2 Sheets-Sheet 2
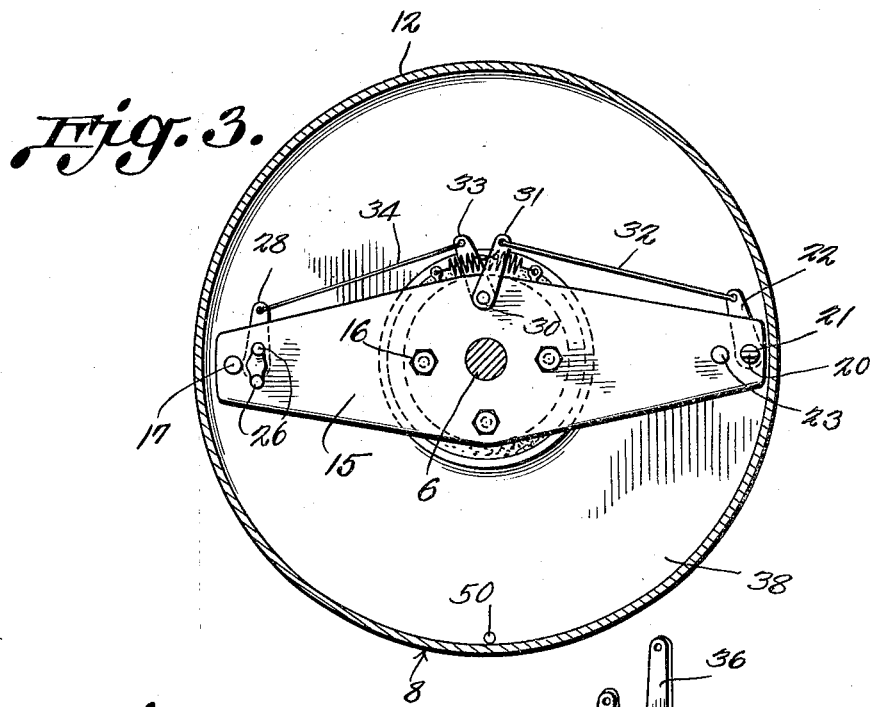
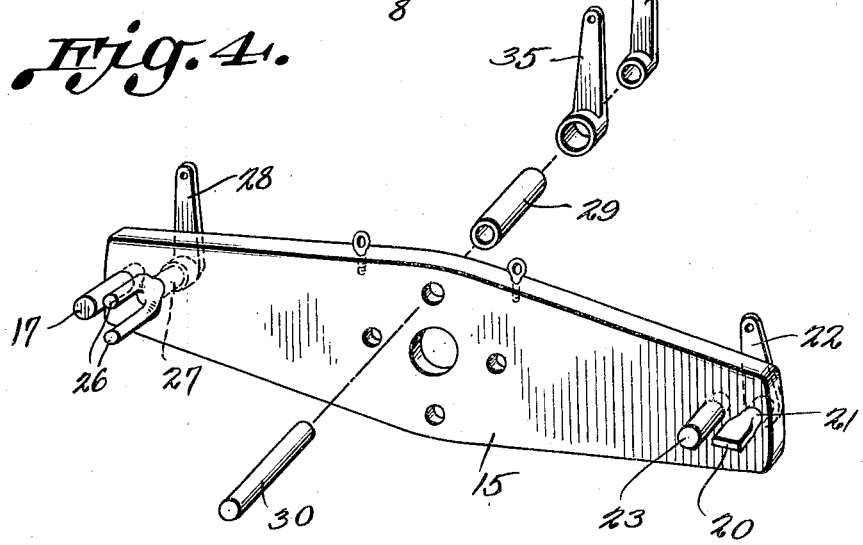
Reuben L. Skinner
Inventor
Attorneys.

Patented Aug. 30, 1932

1,874,129

UNITED STATES PATENT OFFICE

REUBEN L. SKINNER, OF PRATT, KANSAS, ASSIGNOR OF ONE-HALF TO ESCUR EMERAL ROGERS, OF HUTCHINSON, KANSAS

BRAKE

Application filed January 23, 1930. Serial No. 422,823.

This invention aims to provide a brake for a vehicle wheel, the construction being such that the brake may be applied either to the forward wheel or to the rear wheel of a vehicle, the brake mechanism being housed within a water-tight drum, so that mud, snow, and rain cannot get to the brake bands, and to the brake drums, with well-known undesirable results. Another object of the invention is to provide a brake which will run in oil. The invention aims, moreover, to provide novel means for operating the brake bands with respect to the drums.

It is within the province of the disclosure to improve generally and to enhance the utility of devices of that sort to which the present invention appertains.

With the foregoing and other objects in view, which will appear as the description proceeds, the invention resides in the combination and arrangement of parts and in the details of construction hereinafter described and claimed, it being understood that changes may be made in the precise embodiment of the invention herein disclosed, within the scope of what is claimed, without departing from the spirit of the invention.

In the accompanying drawings:

Figure 3 is a section on the line 3—3 of Figure 1;

Figure 4 is a composite perspective showing the beam and attendant parts.

Figure 2:
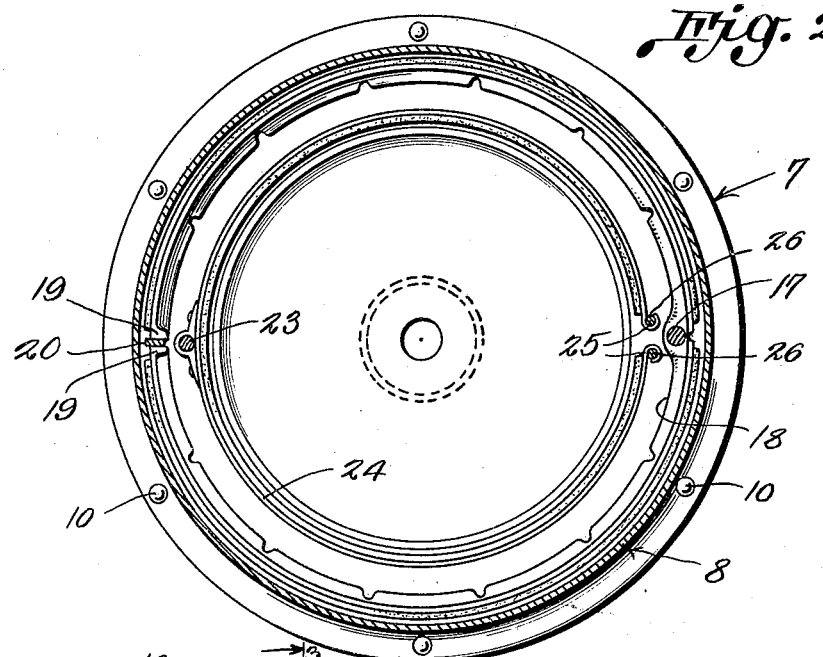
Figure 2 is a section on the line 2—2 of Figure 1.
Figure 1:
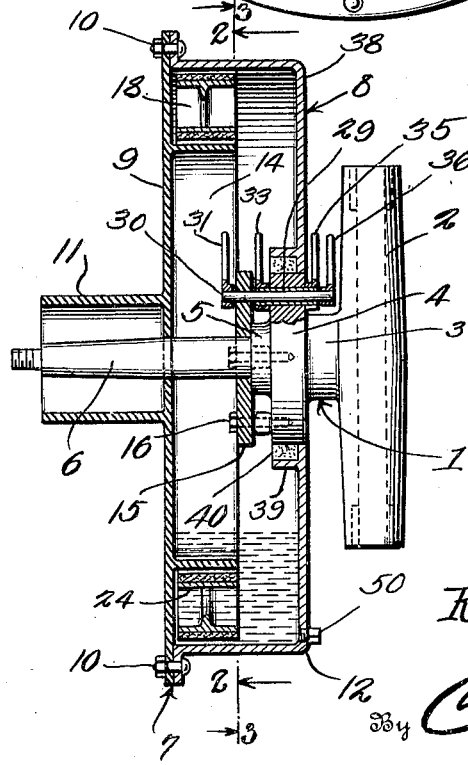
Figure 1 shows in vertical transverse section, a device constructed in accordance with the invention, and applied to the front wheel of an automobile.

The device forming the subject matter of this application may, of course, be applied either to the front wheel or the rear wheel of an automobile, but by way of illustration, in Figure 1, the invention has been shown as applied to a front wheel, an automobile mechanic being entirely competent to make the necessary changes that will adapt the device to a rear wheel.

The numeral 1 designates, generally, a support, including a steering knuckle 2 having a neck 3 to which is connected a disc 4 provided with an outstanding boss 5 from which projects the front axle 6 of an automobile.

The numeral 7 has been used to designate, generally, a closed casing, made up of a cup-shaped body 8 to which a cap plate 9 is attached by securing elements 10. The casing 7 has a plug 50 for the introduction and drainage of oil. The cap plate 9 carries an outwardly extended hub 11, and the front vehicle wheel (not shown) is connected to the casing 7 in any suitable way, through the instrumentality of the hub 11 and the axle 6. The casing 7, therefore, turns with the automobile wheel. The body 8 of the casing 7 includes a rear wall 38 having an annular flange 39 within which is disposed a packing 40 located about the disc 4, so that no water or dirt can get into the casing 7 at this point.

The rim of the body 8 of the casing 7 is designated by the numeral 12, and forms the outer drum of the brake mechanism. An inner drum 14 extends into the body 8 of the casing 7 and is carried by the cap plate 9.

The numeral 15 marks a beam or support located within the casing 7. Through the instrumentality of securing elements 16, the beam 15 is connected to the disc 4, which forms part of the support that is designated generally by the numeral 1. On one end of the beam 15 there is a stub shaft 17 supporting the intermediate portion of an outer brake shoe 18 of annular form. The outer brake shoe 18 cooperates with the outer drum 12. The outer brake shoe 18 has relatively movable ends 19 between which extends a cam 20 on a shaft 21 mounted to rock in the beam 15. The shaft 21 has an upstanding arm 22 located within the casing 7. A stub shaft 23 is mounted in the beam 15 and on the stub shaft 23 is supported the intermediate portion of an inner brake shoe 24 that cooperates with the inner drum 14. The stub shafts 17 and 23 are located diametrically opposite to each other. The brake shoe 24 terminates in eyes 25 in which are mounted the prongs 26 of a shaft 27 journaled in the beam 15. An arm 28 is secured to the shaft 27 and is located within the casing 7.

A tubular shaft 29 is mounted to turn in the disc 4 of the support 1. The shaft 29 may be alluded to as an outer shaft, within which rocks an inner shaft 30 extended through the beam 15. The inner shaft 30 has an arm 31 located within the casing 7. A link 32 is pivoted to the arm 31 and to the arm 22 of the shaft 21. The tubular or outer shaft 29 has an arm 33 located within the casing 7. The arms 33 and 31 are located on opposite sides of the beam 15. A link 34 is pivoted to the arm 33 of the shaft 29 and to the arm 28 of the shaft 27. On the outer end of the tubular shaft 29 there is an arm 35, external to the casing 7. On the shaft 30 there is an arm 36, external to the casing 7. The arms 35 and 36 are adapted to be connected to any of the usual means (not shown) whereby the foot brake and the hand brake may be operated from a point adjacent to the drivers seat in a motor-propelled vehicle.

In practical operation, by means of the arm 36, the shaft 30 may be rotated, and the arm 31 will impart movement to the arm 22, by way of the link 32. The arm 22 rotates the shaft 21, and the cam 20 cooperates with the ends 19 of the outer brake shoe 18, to expand the outer brake shoe and to cause it to engage the outer drum 12. By way of the arm 35, the tubular shaft 29 may be rotated, and when rotation is imparted to the tubular shaft 29, the arm 33 will act through the link 34 and the arm 28 to rock the shaft 27, the prongs 26 of the fork of the shaft 27 coacting with the eyes 25 on the inner brake shoe 24 to contract the inner brake shoe about the inner brake drum 14, which turns in oil, the level of the oil being indicated by the numeral 51 in Figure 1.

Figure 1 shows very clearly that all parts of the brake mechanism proper are housed within the casing 7. It is practically impossible, therefore, for rain, snow, or dirt to get into the brake mechanism, thereby grinding it away or causing it to be so smooth that it will not take hold.

What is claimed is:

In a vehicle brake mechanism, the combination of an axle, an hermetically-closed casing having means for the introduction of liquid thereinto, the casing being journaled weather-tight and liquid-tight on the axle, the casing having a plurality of drums, all of which are inclosed weather-tight and liquid-tight within the casing, a support fixedly carried by the axle and inclosed weather-tight and liquid-tight within the casing, brakes carried by the drums and cooperating with the respective drums, the brakes being inclosed weather-tight and liquid-tight in the casing, concentrically arranged shafts journaled in the support, said shafts extending outwardly through, and fitting closely in, a single opening in a portion of the axle, and operative connections between the shafts and the respective brakes, said connections being mounted in part upon the support.

In testimony that I claim the foregoing as my own, I have hereto affixed my signature.

REUBEN L. SKINNER.